(12) United States Patent
Kim

(10) Patent No.: US 7,201,998 B2
(45) Date of Patent: Apr. 10, 2007

(54) POUCH-TYPE LITHIUM SECONDARY BATTERY

(75) Inventor: Joong-Hun Kim, Cheonan (KR)

(73) Assignee: Samsung SDI Co., Ltd., Suwon-si (KR)

(*) Notice: Subject to any disclaimer, the term of this patent is extended or adjusted under 35 U.S.C. 154(b) by 469 days.

(21) Appl. No.: 10/733,335

(22) Filed: Dec. 12, 2003

(65) Prior Publication Data

US 2004/0121231 A1    Jun. 24, 2004

(30) Foreign Application Priority Data

Dec. 17, 2002    (KR)    .................... 10-2002-0080873

(51) Int. Cl.
*H01M 2/06* (2006.01)
*H01M 2/08* (2006.01)

(52) U.S. Cl. ................. 429/180; 429/162; 429/181

(58) Field of Classification Search ............. 429/162, 429/180, 181, 184
See application file for complete search history.

(56) References Cited

U.S. PATENT DOCUMENTS

| | | | | |
|---|---|---|---|---|
| 4,664,994 A | * | 5/1987 | Koike et al. | 429/181 X |
| 5,183,715 A | * | 2/1993 | North | 429/312 |
| 5,449,575 A | * | 9/1995 | Moulton | 429/162 X |
| 6,267,790 B1 | * | 7/2001 | Daroux et al. | 429/180 X |
| 6,277,516 B1 | * | 8/2001 | Sasaki et al. | 429/162 |
| 6,444,351 B1 | * | 9/2002 | Goto | 429/181 X |
| 6,632,538 B1 | | 10/2003 | Yamazaki et al. | 428/461 |
| 6,841,298 B2 | * | 1/2005 | Yamashita et al. | 429/181 X |

FOREIGN PATENT DOCUMENTS

CN    1262790 A    8/2000

OTHER PUBLICATIONS

Office Action issued in Chinese Patent Application No. 200310123923.8 on Oct. 13, 2006.
U.S. Appl. No. 11/186,835, filed Jul. 22, 2005, inventor Joong-Hun Kim.

* cited by examiner

*Primary Examiner*—Stephen J. Kalafut
(74) *Attorney, Agent, or Firm*—Stein, McEwen & Bui, LLP

(57) ABSTRACT

A pouch-type lithium secondary battery includes a battery unit having a positive plate, a separator, and a negative plate; a plurality of electrode tabs, drawn from the positive and negative plates, respectively; a case, formed with a space receiving the battery unit and with upper and lower sealing surfaces thermally fused to each other; and an insulating tape wrapping the electrode tabs, wherein a portion of the insulating tape interposed between the upper and lower sealing surfaces is thermally fused to the upper and lower sealing surfaces, and an end portion of the insulating tape is exposed outside the case together with the electrode tabs and positioned outside the upper or lower sealing surface after being folded. A portion of the insulating tape exposed outside the sealing surface of the case is extended and the extended portion of the insulating tape comes in contact with the end portion of the sealing surface after being folded. Therefore, preventing an electrical short circuit between the electrode tab and the intermediate layer of the metal case is achieved.

18 Claims, 5 Drawing Sheets

POUCH-TYPE LITHIUM SECONDARY BATTERY

CROSS-REFERENCE TO RELATED APPLICATIONS

This application claims the priority of Korean Patent Application No. 2002-80873, filed on Dec. 17, 2002, in the Korean Intellectual Property Office, the disclosure of which is incorporated herein in its entirety by reference.

BACKGROUND OF THE INVENTION

1. Field of the Invention

The present invention relates to a lithium secondary battery, and more particularly, to a pouch-type lithium secondary battery with improved arrangement of an electrode tab with respect to the sealing surface of a case thereof.

2. Description of the Related Art

Recently, with development of portable electronic devices such as cellular phones, notebook computers, and camcorders, chargeable/dischargeable secondary batteries have been actively studied. Examples of such secondary batteries include nickel-cadmium batteries, nickel-metal hydride batteries, nickel-hydrogen batteries, and lithium secondary batteries. Among these batteries, lithium secondary batteries have an operation voltage of 3.6 V, which is three times higher than the operation voltage of nickel-cadmium batteries or nickel-metal hydride batteries, which have been the main sources of power for portable electronic devices. In addition, lithium secondary batteries have an excellent energy density per unit weight. Therefore, use of lithium secondary batteries has been rapidly increasing.

According to the kind of an electrolyte used, lithium secondary batteries are classified as lithium ion batteries, which use a liquid electrolyte, and lithium polymer batteries, which use a polymer electrolyte.

Lithium secondary batteries can be manufactured in various shapes. Representative shapes of lithium secondary batteries are a cylinder and a prism, which are common shapes of lithium ion batteries. Recently, a flexible pouch-type lithium polymer battery has been attracting attention because of its relatively easily changeable shape, excellent safety, and lightweight. Such a pouch-type lithium polymer battery enables further reduction in the size and weight of portable electronic devices.

FIG. 1 illustrates a top plan view of a conventional lithium secondary battery.

Referring to FIG. 1, the lithium secondary battery 10 comprises a battery unit 11 and a case 12, which is formed with a space 12a for receiving the battery unit 11.

The battery unit 11 comprises a positive plate, a negative plate, and a separator interposed therebetween. The battery unit 11 is formed by winding the positive plate, the separator, and the negative plate, which are sequentially wound into a jelly-roll structure, or sequentially laminating the positive plate, the separator, and the negative plate into a stack structure.

A positive tab 13 and a negative tab 14 electrically connected to the respective electrode plates of the battery unit 11 are installed such that a predetermined length of them is exposed outside upper and lower sealing surfaces 12b of the case 12. Portions of the electrode tabs 13 and 14 that come in contact with the upper and lower sealing surfaces 12b are wrapped with an insulating tape 15.

As illustrated in FIG. 3, unlike a cylindrical or prismatic can made of a metal material, the case 12 has a pouch-type structure, which comprises an intermediate layer 12d made of a metal foil, and inner and outer layers 12e and 12f made of an insulating film. The case 12 is formed with the space 12a for receiving the battery unit 11 and with the upper and lower sealing surfaces 12b, which are thermally fused to each other.

FIG. 2 illustrates a sectional view of the pouch-type lithium secondary battery of FIG. 1.

Referring to FIG. 2, portions of the electrode tabs 13 and 14 are positioned between the upper and lower sealing surfaces 12b of the case 12 and end portions of the electrode tabs 13 and 14 are exposed outside the upper and lower sealing surfaces 12b of the case 12. Portions of the electrode tabs 13 and 14, which come in contact with the upper and lower sealing surfaces 12b, are wrapped with an insulating tape 15. In order to prevent the inner layer 12e from being pushed outward when the upper and lower sealing surfaces 12b are thermally fused to each other, end portions 12c of the upper and lower sealing surfaces 12b are upwardly and downwardly inclined at a predetermined angle with respect to the electrode tabs 13 and 14.

In order to manufacture the lithium secondary battery 10 with the aforementioned structure, first, the battery unit 11 is formed by winding or laminating a positive plate and a negative plate with a separator interposed therebetween. The formed battery unit 11 is inserted into the space 12a of the case 12. Then, the upper and lower sealing surfaces 12b of the case 12 are thermally fused to each other to hermetically seal the battery unit 11. In this case, the insulating tape 15, which wraps around the electrode tabs 13 and 14 and is interposed between the upper and lower sealing surfaces 12b, is also thermally fused to the upper and lower sealing surfaces 12b.

Next, end portions of the electrode tabs 13 and 14, which are exposed outside the case 12, are folded toward the case 12 at least one time. The end portions of the folded electrode tabs 13 and 14 are positioned outside one of the upper and lower sealing surfaces and are electrically connected to the terminal of a separately prepared protective circuit board (not shown).

However, such a conventional lithium secondary battery 10 has the following problems.

When the electrode tabs 13 and 14 are folded toward the case 12 to electrically connect the end portions of the electrode tabs 13 and 14 to the protective circuit board, the inner surfaces of the electrode tabs 13 and 14 come in contact with the end portion 12c of the upper or lower sealing surface 12b. In this case, the intermediate layer 12d of the end portion 12c, which is exposed outside by a cutting process for completing the shape of the case 12, comes in contact with the electrode tabs 13 and 14. As a result, a short circuit between the case and the electrode tabs may occur. In addition, the protective circuit board, which is positioned outside one of the upper and lower sealing surfaces 12b, is likely to come in direct contact with outer surfaces of the upper and lower sealing surfaces 12b. For these reasons, the safety and reliability of the lithium secondary battery 10 cannot be assured.

SUMMARY OF THE INVENTION

The present invention provides a pouch-type lithium secondary battery with enhanced stability, by improving the arrangement of electrode tabs and insulating tapes, which wrap the electrode tabs, with respect to a case thereof.

According to an aspect of the present invention, there is provided a pouch-type lithium secondary battery, including:

a battery unit having a positive plate, a separator, and a negative plate; a plurality of electrode tabs, which are drawn from the positive and negative plates, respectively; a case, which is formed with a space for receiving the battery unit and with upper and lower sealing surfaces which are thermally fused to each other; and an insulating tape for wrapping the electrode tabs, wherein a portion of the insulating tape interposed between the upper and lower sealing surfaces is thermally fused to the upper and lower sealing surfaces, and an end portion of the insulating tape is exposed outside the case together with the electrode tabs and is positioned outside the upper or lower sealing surface after being folded.

According to an aspect of the present invention, the electrode tabs are folded, starting from an end portion of the upper or lower sealing surface, toward the case.

According to another aspect, the insulating tape has a portion which comes in contact with the end portion of one of the upper and lower sealing surfaces when folded.

According to another aspect, the folded portion of the insulating tape is at least 5% of the total width of the upper or lower sealing surface of the case.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
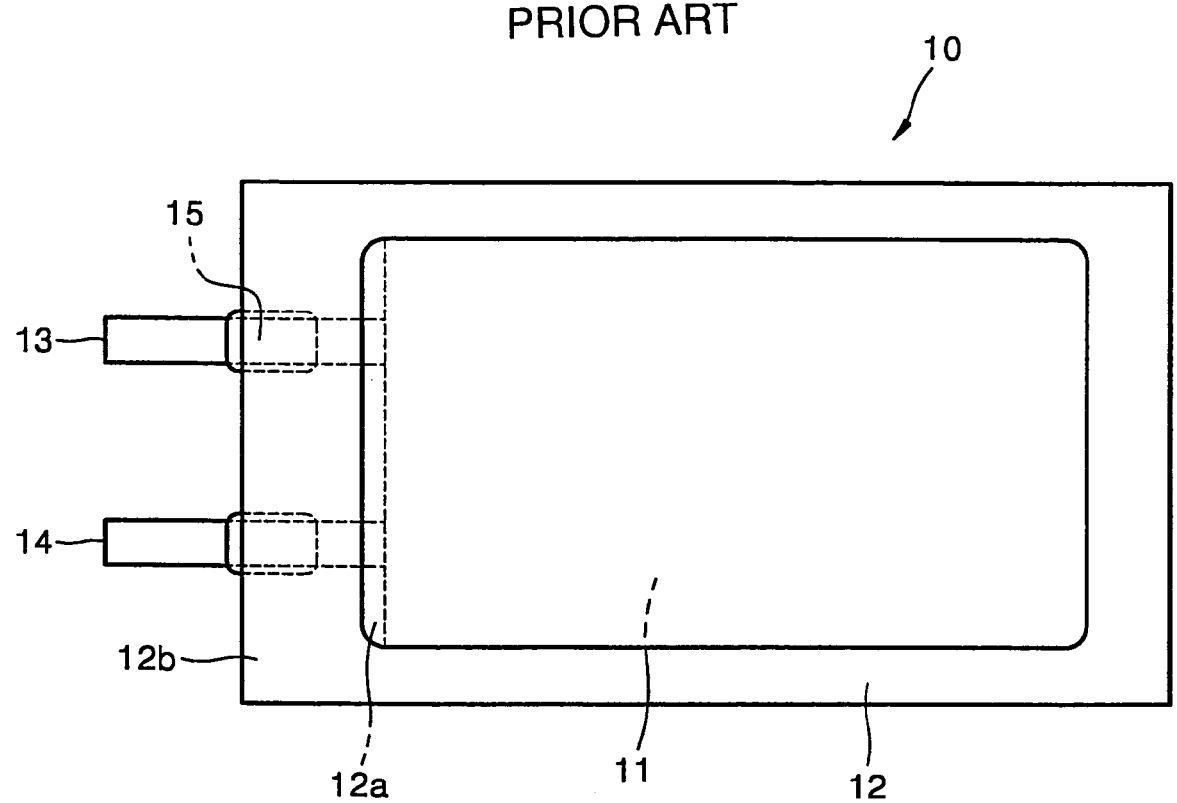
FIG. 1 illustrates a top plan view of a conventional lithium secondary battery.
Figure 2:
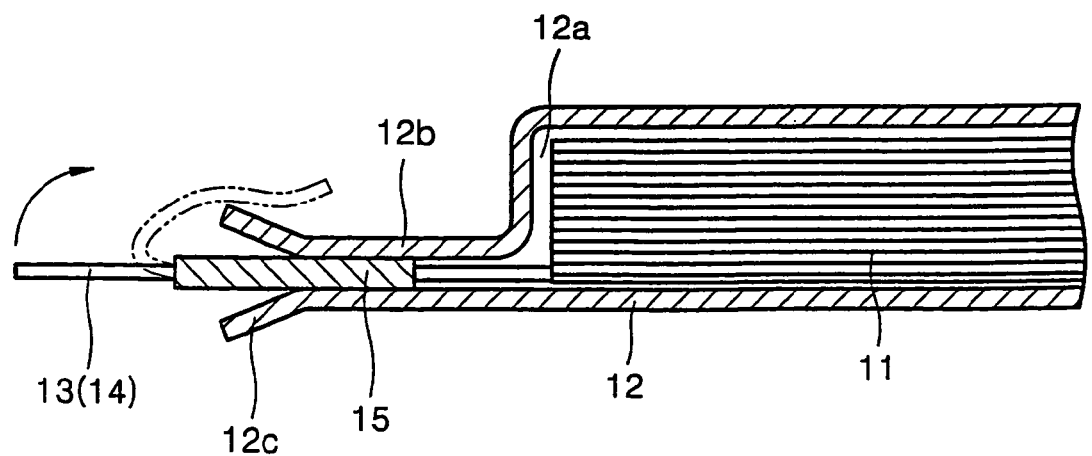
FIG. 2 illustrates a sectional view of the conventional lithium secondary battery of FIG. 1.
Figure 3:
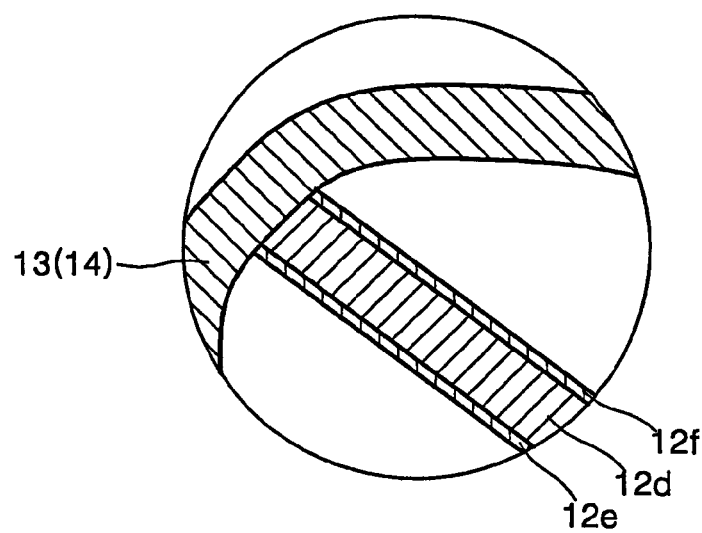
FIG. 3 illustrates an enlarged sectional view of an electrode tab and a sealing surface of FIG. 2 in contact.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
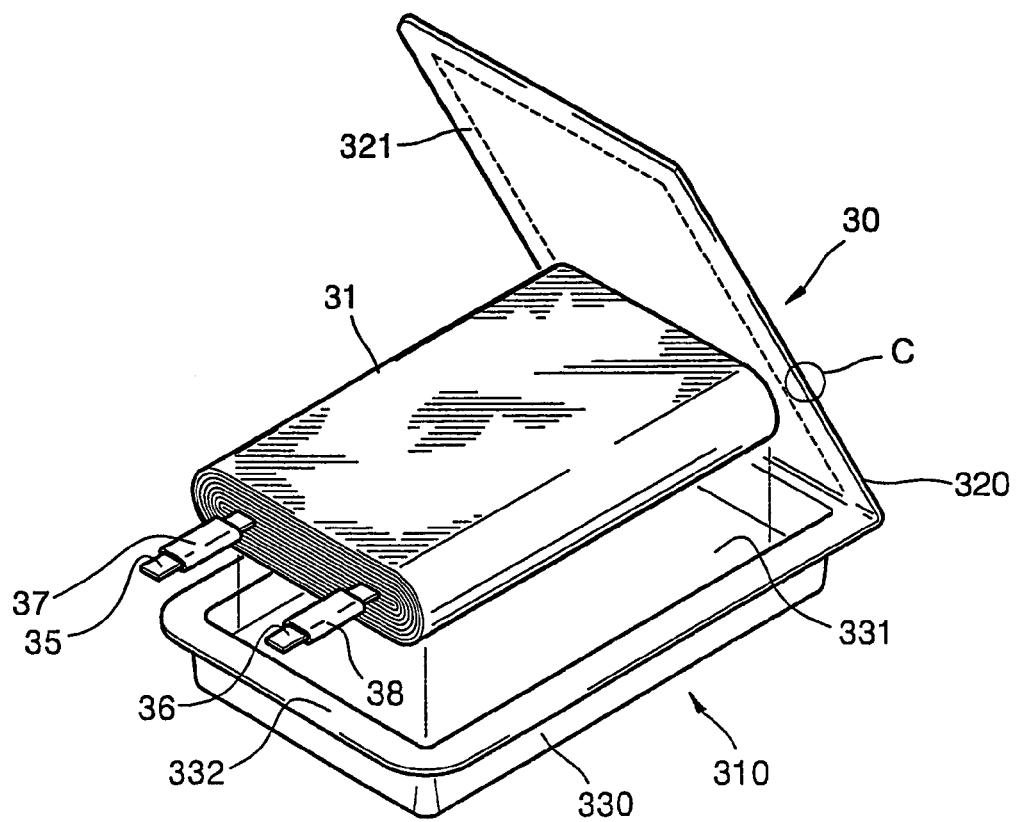
FIG. 4 illustrates an exploded perspective view of a lithium secondary battery according to an embodiment of the present invention.

FIG. 4 illustrates an exploded perspective view of a lithium secondary battery according to an embodiment of the present invention.

Figure 5:
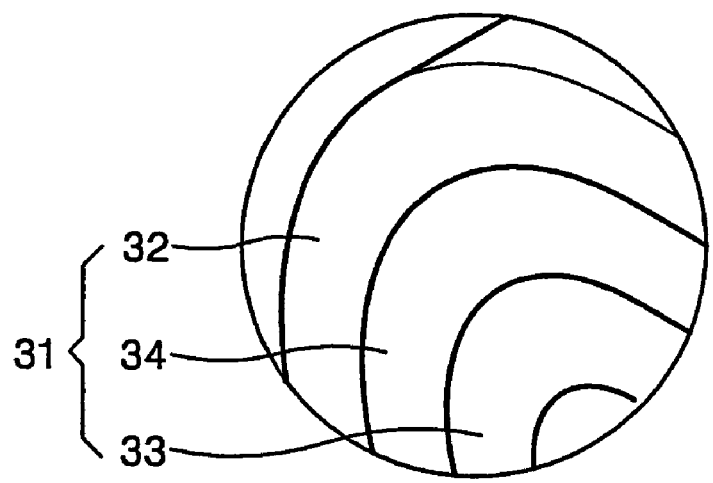
FIG. 5 illustrates an enlarged perspective view of a battery unit of FIG. 4.

FIG. 5 illustrates an enlarged perspective view of a battery unit of FIG. 4.

The battery unit 31 comprises a positive plate 32, a negative plate 33, and a separator 34, which is interposed therebetween, as illustrated in FIG. 5.

The positive plate 32 is formed by coating a strip shaped metal plate such as a positive collector made of an aluminium film with an positive active material which comprises a lithium based oxide as a main component, a binder, and a conductive material. The positive plate 32 is electrically connected to a positive tab 35, which is wrapped with a positive insulating tape 37.

The negative plate 33 is formed by coating a strip shaped metal plate such as a negative collector made of a copper film with a negative active material which comprises a carbon material as a main component, a binder, and a conductive material. The negative plate 33 is electrically connected to the negative tab 36, which is wrapped with a negative insulating tape 38.

With respect to the separator 34, at least one separator is positioned between the positive plate 32 and the negative plate 33 to maintain electrical insulation therebetween. The separator 34 is made of a polyethylene film, a polypropylene film, or a combination thereof. Preferably, the separator 34 is formed to be wider than the positive and negative plates 32 and 33 to prevent a short circuit between the positive and negative plates 32 and 33.

Referring to FIG. 4, the lithium secondary battery 30 comprises a battery unit 31 and a case 310 for receiving the battery unit 31.

The case 310 comprises an upper portion 320 and a lower portion 330 which are coupled with each other. At least one side of the upper portion 320 is connected to at least one side of the lower portion 330. Such a case 310 has a cuboid form.

The lower portion 330 is formed with a space 331 for receiving the battery unit 31 and with a lower sealing surface 332 along the edge of the space 331. The upper portion 320 is also formed with an upper sealing surface 321, which corresponds to the lower sealing surface 332. The upper and lower sealing surfaces 321 and 332 are thermally fused to each other after the battery unit 31 is inserted into the space 331.

Figure 6:
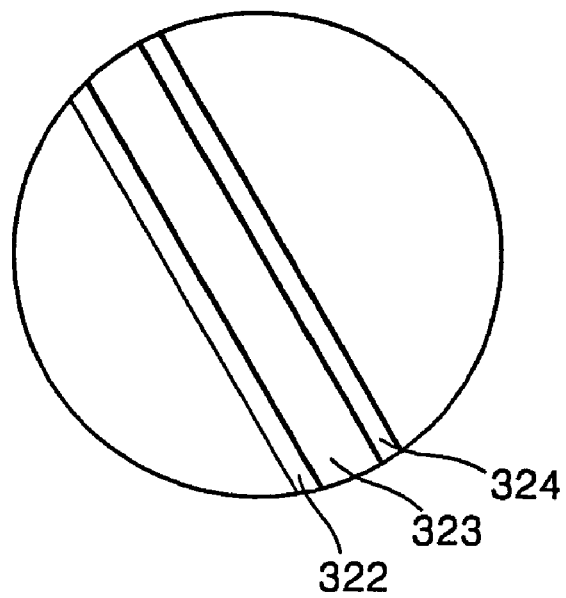
FIG. 6 illustrates an enlarged perspective view of the case of FIG. 4 at a position shown by the reference character "C"

FIG. 6 illustrates an enlarged perspective view of a case of FIG. 4.

Preferably, the upper and lower portions 320, 330 are made of the substantially same material. Each of the upper and lower portions 320, 330 of the case 310 comprises an inner layer 322 made of an insulating polymer film, an intermediate layer 323 made of a metal material, and an outer layer 324 made of an insulating polymer film, which are sequentially laminated to form a stacked structure, as illustrated in FIG. 6.

The battery unit 31 is formed by repeatedly folding the positive plate 32, the separator 34, and the negative plate 33, which are sequentially laminated, in one direction.

The wound battery unit 31 is inserted into the space 331 of the lower portion 330. In this case, an end portion of each of the positive and negative tabs 35 and 36, which are drawn from the respective electrode plates 32 and 33, is exposed outside the case 310.

Then, when predetermined amounts of heat and pressure are applied to the case 310 while the upper and lower sealing surfaces 321 and 332 come in contact with each other, the upper and lower sealing surfaces 321, 332 are thermally fused to each other. Accordingly, the pouch-type lithium secondary battery 30 is completed.

The insulating tapes 37 and 38, which wrap the electrode tabs 35 and 36, respectively, are interposed between and thermally fused to the upper and lower sealing surfaces 321 and 332. End portions of the insulating tapes 37 and 38 are exposed outside the case 310 and folded together with the electrode tabs 35 and 36 at least one time.

The folding of the electrode tabs 35 and 36 and the insulating tapes 37 and 38 will now be described in more detail.

Figure 7:
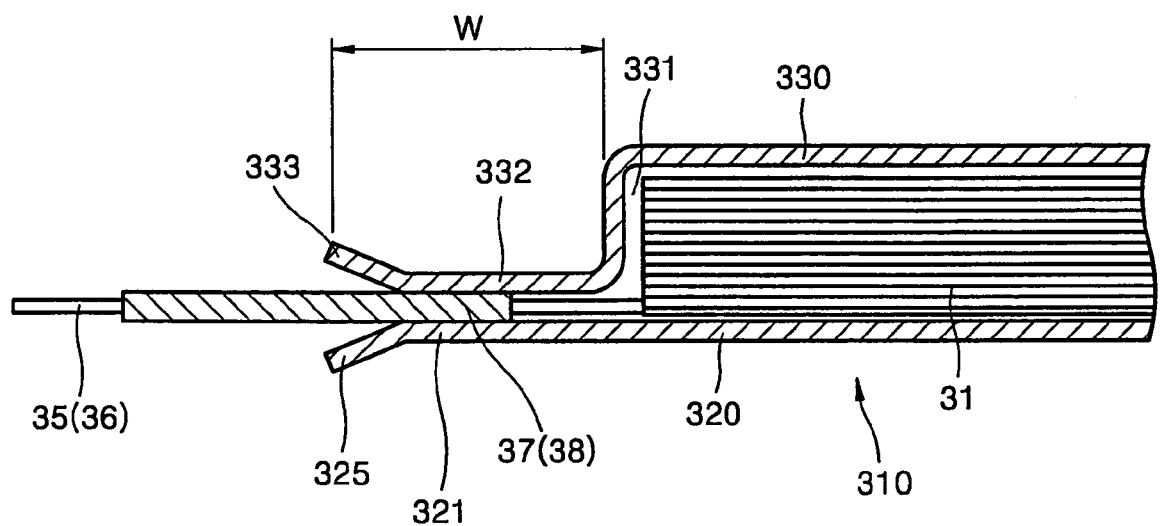
FIG. 7 illustrates a sectional view of an unfolded state of an electrode tab in the lithium secondary battery of FIG. 4.
Figure 8:
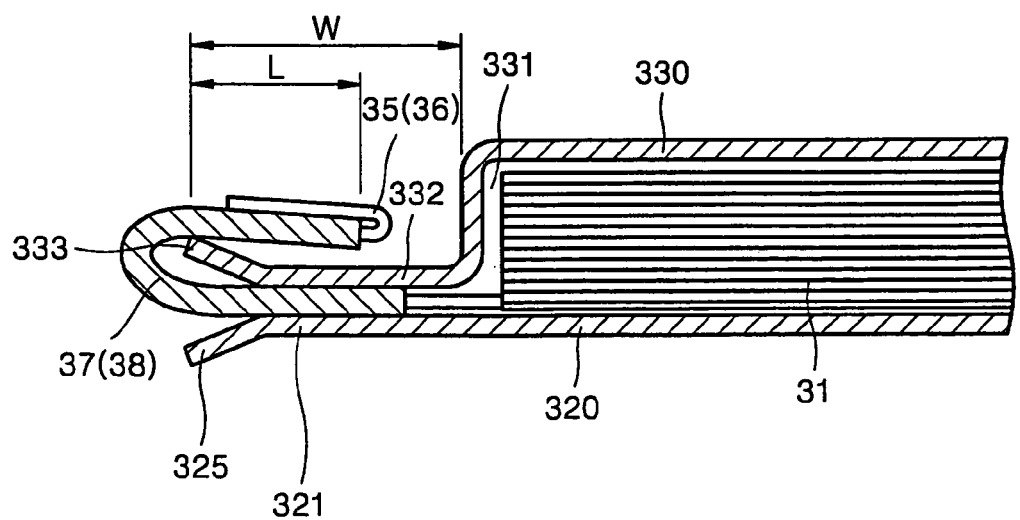
FIG. 8 illustrates a sectional view of a folded state of the electrode tab in the lithium secondary battery of FIG. 4.

FIG. 7 illustrates an unfolded state of the electrode tabs 35 and 36 of FIG. 4 and FIG. 8 illustrates a folded state of the electrode tabs 35 and 36 of FIG. 4.

In FIGS. 7 and 8, the same reference numerals as in FIG. 4 indicate the same constitutional elements, which execute the same functions.

Referring to FIG. 7, the upper portion 320 is formed with the upper sealing surface 321. The lower portion 330 is also formed with the lower sealing surface 332, which faces the upper sealing surface 321. Each of the upper and lower sealing surfaces 321 and 332, which are thermally fused to each other, has a predetermined width W.

The end portion 325 of the upper sealing surface 321 is inclined at a predetermined angle in one direction. The end portion 333 of the lower sealing surface 332 is inclined at a predetermined angle in a direction opposite to the end portion 325 of the upper sealing surface 321 with respect to the electrode tabs 35 and 36. Therefore, the end portions 325, 333 of the upper and lower sealing surfaces 321 and 332 are inclined at a predetermined angle upwardly and downwardly with respect to the electrode tabs 35 and 36, respectively.

The electrode tabs 35 and 36, which are wrapped with the insulating tapes 37 and 38, are positioned between the upper and lower sealing surfaces 321 and 332. Here, end portions of the insulating tapes 37 and 38 are exposed outside the case 310. The exposed insulating tapes 37 and 38 have portions which come in contact with the end portion 325 of the upper sealing surface 321 or the end portion 333 of the lower sealing surface 332, when folded together with the electrode tabs 35 and 36 toward the case 310.

Preferably, the folded length L of the insulating tapes 37 and 38 is at least 5% of the total width W of the sealing surfaces 321 and 332, to prevent a short circuit between the case and the electrode tabs. Although there is no need to set a specific upper limit of the folded length, about 90% of the total width W of the sealing surfaces 321 and 332 is sufficient in view of the efficiency of a battery manufacturing process. Therefore, the folded length of the insulating tapes 37 and 38 ranges from 5 to 90% of the total width W of the sealing surfaces 321 and 332. According to the results of experiments performed by the present applicant, the optimal folded length ranges from 30 to 50%.

End portions of the exposed insulating tapes 37 and 38 are folded together with the electrode tabs 35 and 36, starting from the end portion 325 of the upper sealing surface 321 or the end portion 333 of the lower sealing surface 332, toward the case 310. Then, after being folded again in the opposite direction, the end portions of the electrode tabs 35 and 36 are electrically connected to a separately prepared protective circuit board.

Figure 9:
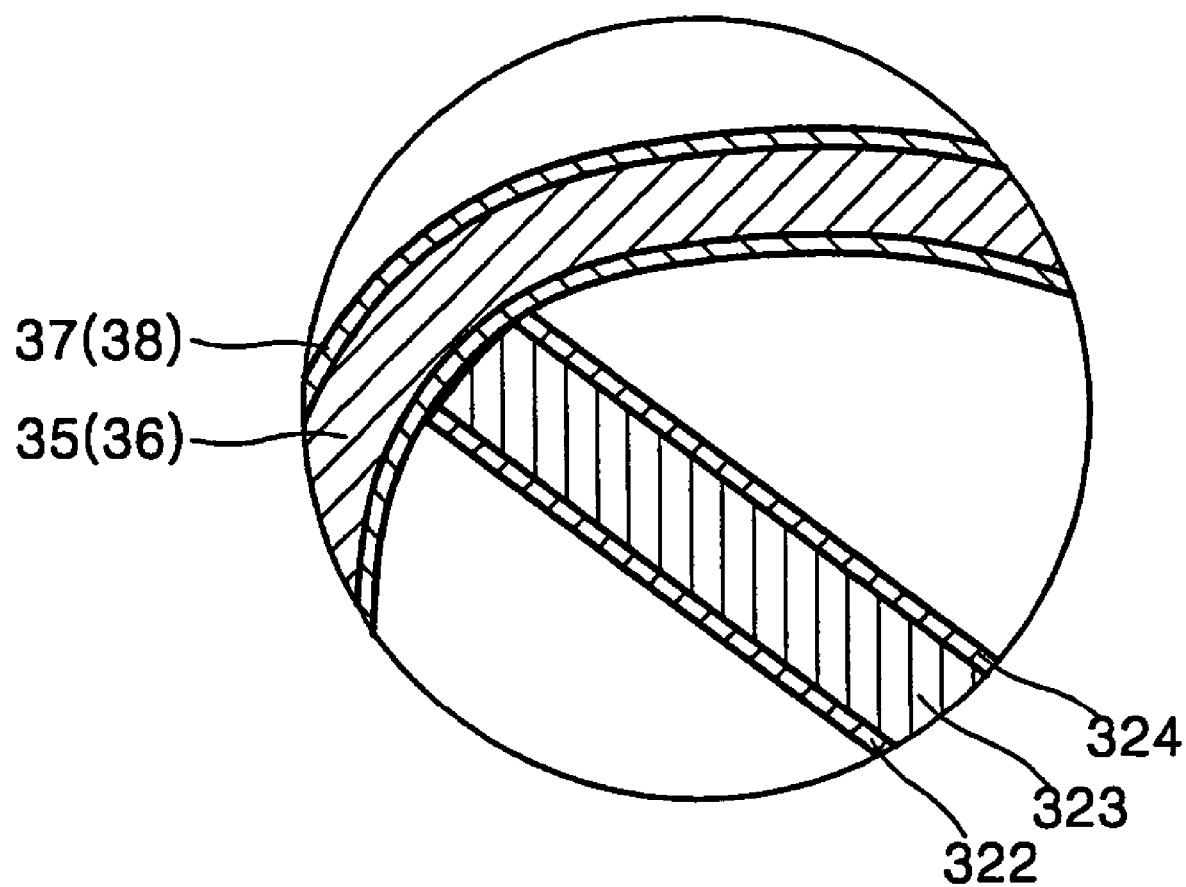
FIG. 9 illustrates an enlarged sectional view of the folded portion of the electrode tab of FIG. 8.

FIG. 9 illustrates an enlarged sectional view of the folded portion of the electrode tab.

Here, because the end portions of the insulating tapes 37 and 38 are positioned outside the sealing surfaces 321 and 332, the electrode tabs 35 and 36 do not come in direct contact with the intermediate layer 323 of the case 310.

As apparent from the above description, a pouch-type lithium secondary battery of the present invention provides the following effects.

First, a portion of the insulating tape exposed outside the sealing surface of the case is extended and the extended portion of the insulating tape comes in contact with the end portion of the sealing surface after being folded. Therefore, an electrical short circuit between the electrode tab and the intermediate layer of the metal case is prevented.

Second, the insulating tape, which is exposed outside the case, is folded toward the case and then positioned outside the sealing surface. Therefore, the likelihood of direct contact between a protective circuit board and the surface of the case is lowered.

Third, because a portion of the insulating tape exposed outside the case is relatively long, a short circuit caused by stripping of an outer layer of the case can be prevented. Therefore, the safety and reliability of the lithium secondary battery can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pouch-type lithium secondary battery, comprising:
   a battery unit having a positive plate, a separator, and a negative plate;
   a plurality of electrode tabs respectively coupled to the positive and negative plates;
   a case, formed with a space receiving the battery unit and with upper and lower sealing surfaces which are thermally fused to each other, the electrode tabs being extended from the case between the fused surfaces, folded back toward one of the fused surfaces, and then folded away from the one of the fused surfaces; and
   insulating tape wrapping the electrode tabs from positions between the fused surfaces to the positions where the electrode tabs are folded away from the one of the fused surfaces.

2. The pouch-type lithium secondary battery according to claim 1, wherein the electrode tabs are folded, starting from an end portion of the upper or lower sealing surface, toward the case.

3. The pouch-type lithium secondary battery according to claim 2, wherein the insulating tape has a portion which comes in contact with the end portion of one of the upper and lower sealing surfaces when folded.

4. The pouch-type lithium secondary battery according to claim 3, wherein the contacted portion of the insulating tape completely wraps the electrode tab to provide electrical insulation between the electrode tab and the case.

5. The pouch-type lithium secondary battery according to claim 2, wherein a folded portion of the insulating tape is positioned outside one of the upper and lower sealing surfaces.

6. The pouch-type lithium secondary battery according to claim 2, wherein a folded portion of the insulating tape is at least 5% of a total width of the upper or lower sealing surface.

7. The pouch-type lithium secondary battery according to claim 6, wherein the folded portion of the insulating tape ranges from 5 to 90% of the total width of the upper or lower sealing surface.

8. The pouch-type lithium secondary battery according to claim 6, wherein the folded portion of the insulating tape ranges from 30 to 50% of the total width of the upper or lower sealing surface.

9. The pouch-type lithium secondary battery according to claim 1, wherein a portion of the insulating tape interposed between the upper and lower sealing surfaces is thermally fused to the upper and lower sealing surfaces.

10. A lithium battery, comprising:
- a case, including upper and lower sealing surfaces thermally fused to each other, and a space housing a battery unit, the battery unit including a positive plate, a separator, and a negative plate;
- a plurality of electrode tabs respectively coupled to the positive and negative plates, the electrode tabs being extended from the case between the fused surfaces, folded back toward one of the fused surfaces, and then folded away from the one of the fused surfaces; and
- insulating tape wrapping the electrode tabs from positions between the fused surfaces to the positions where the electrode tabs are folded away from the one of the fused surfaces.

11. The lithium battery according to claim 10, wherein the plurality of electrode tabs are folded, from an end portion of the upper or lower sealing surface, toward the case.

12. The lithium battery according to claim 11, wherein the insulating tape has a portion which comes in contact with the end portion of one of the upper and lower sealing surfaces when folded.

13. The lithium battery according to claim 12, wherein the contacted portion of the insulating tape completely wraps the electrode tab to provide electrical insulation between the electrode tab and the case.

14. The lithium battery according to claim 11, wherein a folded portion of the insulating tape is positioned outside one of the upper and lower sealing surfaces.

15. The lithium battery according to claim 11, wherein a folded portion of the insulating tape is at least 5% of a total width of the upper or lower sealing surface.

16. The lithium battery according to claim 15, wherein the folded portion of the insulating tape ranges from 5 to 90% of the total width of the upper or lower sealing surface.

17. The lithium battery according to claim 15, wherein the folded portion of the insulating tape ranges from 30 to 50% of the total width of the upper or lower sealing surface.

18. The lithium battery according to claim 10, wherein a portion of the insulating tape interposed between the upper and lower sealing surfaces is thermally fused to the upper and lower sealing surfaces.

* * * * *